US007164490B2

(12) United States Patent
Manico et al.

(10) Patent No.: US 7,164,490 B2
(45) Date of Patent: Jan. 16, 2007

(54) CUSTOM CUT IMAGE PRODUCTS

(75) Inventors: Joseph A. Manico, Rochester, NY (US); John R. Fredlund, Rochester, NY (US); Dale F. McIntyre, Honeoye Falls, NY (US); Jan A. Herdzik, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 873 days.

(21) Appl. No.: 09/882,165

(22) Filed: Jun. 15, 2001

(65) Prior Publication Data

US 2003/0012454 A1 Jan. 16, 2003

(51) Int. Cl.
*G06K 15/00* (2006.01)
*G06F 3/12* (2006.01)

(52) U.S. Cl. .................................... 358/1.18; 358/1.15
(58) Field of Classification Search ............... 358/1.18, 358/1.2, 1.5, 1.15, 3.29, 304, 453, 538; 382/291, 382/199; 345/620–629; 83/13
See application file for complete search history.

(56) References Cited

U.S. PATENT DOCUMENTS

| | | | | |
|---|---|---|---|---|
| 4,918,611 A * | 4/1990 | Shyu et al. ................. | 382/100 |
| 5,537,135 A | 7/1996 | Hevenor et al. | |
| 5,617,487 A | 4/1997 | Yoneyama et al. | |
| 5,666,215 A | 9/1997 | Fredlund et al. | |
| 5,851,614 A * | 12/1998 | Buck ........................ | 428/40.1 |
| 5,873,605 A | 2/1999 | Kaplan | |
| 5,899,010 A * | 5/1999 | Peck ............................ | 40/618 |
| 5,949,431 A * | 9/1999 | Matsumura et al. ......... | 345/635 |
| 5,962,368 A * | 10/1999 | Poole .......................... | 503/227 |
| 5,974,401 A * | 10/1999 | Enomoto et al. ............. | 705/40 |
| 5,994,990 A * | 11/1999 | Ogikubo ...................... | 335/285 |
| 6,072,596 A | 6/2000 | Hattori et al. | |
| 6,106,645 A | 8/2000 | Stempien | |
| 6,178,264 B1 | 1/2001 | Kamatani | |
| 6,258,200 B1* | 7/2001 | Kassab ..................... | 156/273.1 |
| 6,519,046 B1* | 2/2003 | Kinjo .......................... | 358/1.1 |
| 6,619,166 B1* | 9/2003 | Miyazaki et al. ............... | 83/13 |
| 6,788,425 B1* | 9/2004 | Ohtsuka et al. ............. | 358/1.13 |
| 6,806,974 B1* | 10/2004 | Ueda et al. ................. | 358/1.13 |
| 2001/0000222 A1 | 4/2001 | Miyazaki et al. | |
| 2002/0092215 A1* | 7/2002 | Fernandez et al. ........ | 40/124.09 |

FOREIGN PATENT DOCUMENTS

EP 0 607 539 11/1993
EP 1 071 272 1/2001

OTHER PUBLICATIONS

"ColorCAMM Pro Model PC-600". Retrieved from the itnernet: URL:http://www.rolanddga.com/pdf/brochure_PC600.pdf.

* cited by examiner

*Primary Examiner*—Dov Popovici
(74) *Attorney, Agent, or Firm*—Thomas J. Strouse

(57) ABSTRACT

A method for obtaining custom cut images products by an ordinary unskilled user/consumer wherein the consumer at a first location identifies a subject within a digital image for producing a cut image product. A software program automatically differentiates the selected subject from the background. The consumer then places an order over a communication network to a production facility at a second location that is remote from the first location for producing a cut image product using the selected subject on a cut sheet of media.

18 Claims, 6 Drawing Sheets

CUSTOM CUT IMAGE PRODUCTS

FIELD OF THE INVENTION

The invention relates to remote a system and method for producing custom cut image products by the average consumer.

BACKGROUND OF THE INVENTION

Applying pressure sensitive adhesive and release sheets to the back sides of photographs to generate "sticker prints" is well known. Typically, these sticker prints are die cut with a fixed format die cutter. With the advent of "Internet Photofinishing", consumers can view, edit, zoom, crop, correct red-eye, make color/density adjustments and many other image adjustments, on-line before the digital images are printed. In addition, consumers can select a finished print size from a list of fixed print sizes.

Digital cutters such as the CM-300 30" Pro Series Vinyl Cutter sold by Roland DGA Corporation, used to make custom cut signage from computer files, can be programmed to any shape or pattern. This system typically uses complex image manipulation software such PhotoShop® by Adobe Systems to produce custom image products. This equipment is also operated by skilled individuals, is expensive and requires routine maintenance such as positioning calibration and knife replacement. Additionally these digital cutters require adjustments to compensate for the various media types that are being cut and are not designed to automatically handle numerous media types. There is currently no Internet Photofinishing service that offers the unskilled average consumer prints that are custom cut to the average consumers' requirements.

It is also known to create "Scrap Books" by cutting photographs into various shapes with scissors and razor knives, applying glue and pasting them into books has become a popular way to preserve and present personal photographic images. This procedure is time consuming, expensive, requires an array of tools and materials, is limited by the skill of the user/consumer and is potentially hazardous because of the use of unfamiliar sharp implements on various print materials of different compositions. It is desirable to provide a choice of cut shapes from fixed, freeform and image derived without requiring a operator or an expensive investment in time, tools and materials. It is toward this end that the present invention is directed.

It is therefore desirable to provide system and method that allows an unskilled user the option to select and indicate how a final print will be cut without the extensive skill required to use complex image manipulation software and at a relative low cost.

SUMMARY OF THE INVENTION

In accordance with one aspect of the present invention there is provided a method for obtaining custom cut image products by an unskilled user, comprising the steps of:

the user identifying a subject within a digital image for producing a cut image product at a first location;

automatically differentiating the selected subject from the background;

placing an order over a communication network to a production facility at a second location that is remote from the first location for producing a cut image product using the selected subject printing an image of the selected subject on a sheet of media; and producing the cut image product from the sheet of media incorporating the selected subject.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which:

FIG. 3*c* shows the fixed pattern of FIG. 3*b* separated from the background of the image;

FIG. 3*d* shows a view of what the cut image product produced from the image of 3*c* would look like;

DETAILED DESCRIPTION OF THE INVENTION

Figure 1:
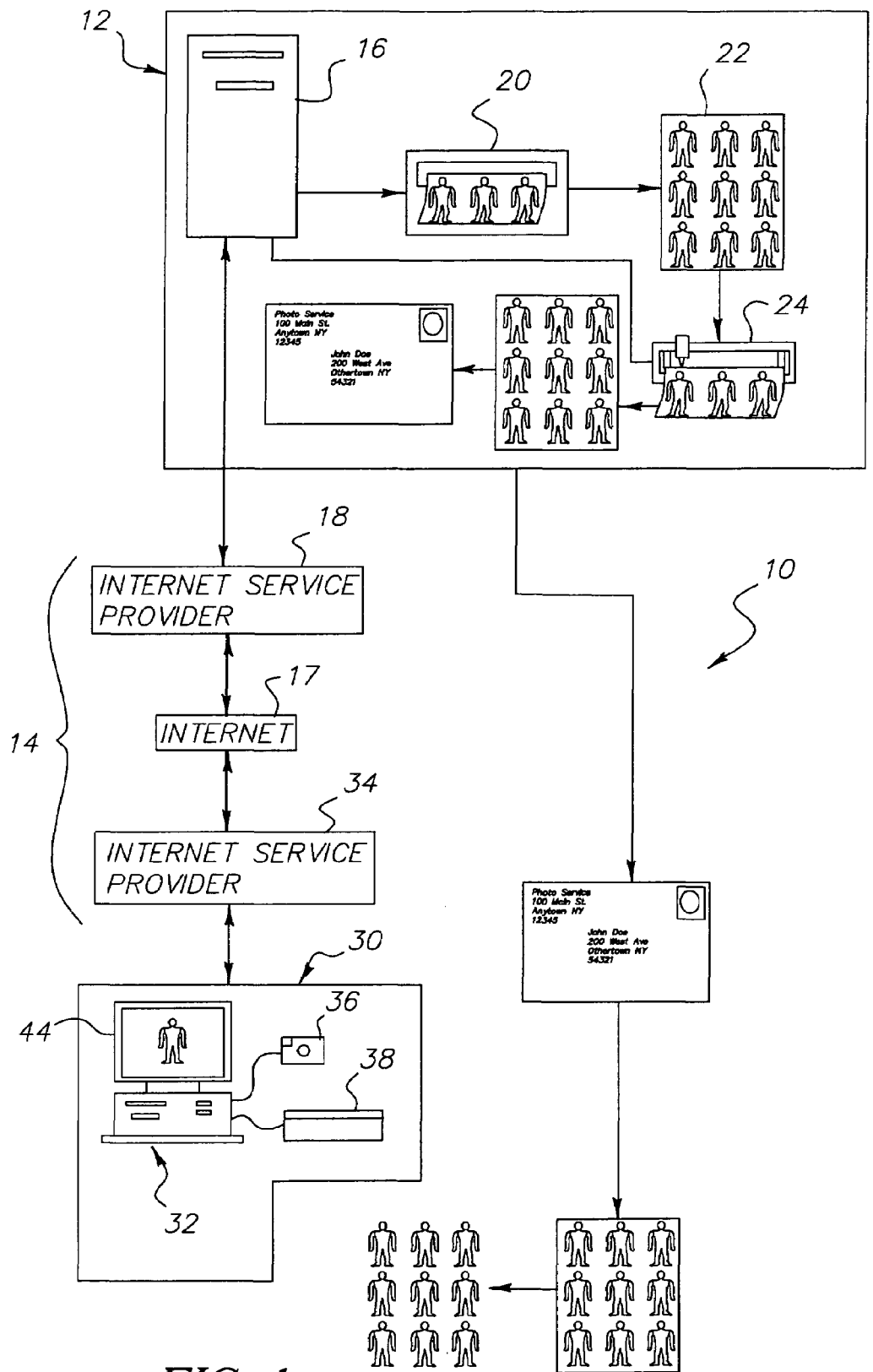
FIG. 1 is an illustration of a system for producing custom cut image products in accordance with the present invention.

Referring to FIG. 1, there is illustrated a diagram of a system 10 made in accordance with the present invention for producing custom cut image products. The system 10 includes custom cut image products, production facility 12, which can be accessed over a communication network 14 through a computer/server 16 located at facility 12. In the particular embodiment illustrated, the communication network 14 comprises the Internet, which is accessed through an Internet Service Provider (ISP) 18. The facility includes a digital printer 20 for printing of images on media 22. The custom cut image products production facility 12 also includes a cutting device 24 that is operably connected to server 16 for cutting of the media 22 along designated paths.

As illustrated, system 10 also includes a remote ordering site 30 for ordering of goods and/or services from facility 12. In the particular embodiment illustrated, the remote ordering site 30 comprises a user having a computer 32 including a display device 44 which is capable of communicating over the Internet 14 through ISP 34. A digital camera 36 and image scanner 38 are connected to computer 32 for obtaining digital images. Image scanner 38 can include capabilities to scan photographs, slides, film negatives and other forms of printed material. Remote ordering site 30 may be a private home, public facility or retail outlet and computer 32 may be a private personal computer or public kiosk such as a Kodak Image Magic Enhancement Station manufactured by the Eastman Kodak Company. Images may be provided to computer 32 from digital camera 36 or image scanner 38 or by any other source. In addition, it is common practice for users to access images stored at remote locations such as with the "You've Got Pictures™" service provided by America Online and the Eastman Kodak Company.

Figures 2A, 2C:
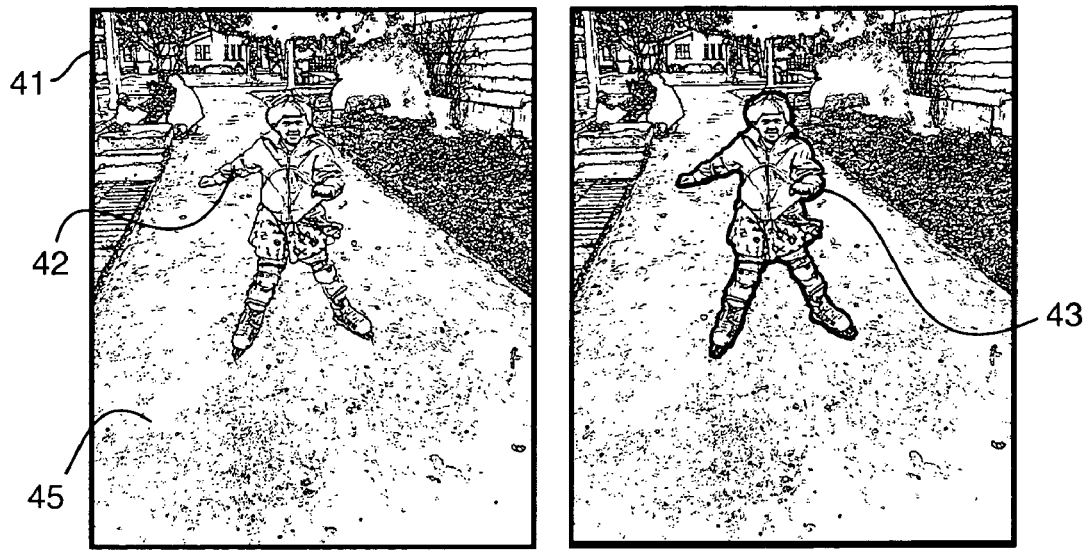
FIG. 2*a* is a plan view of an image from which a subject is to be extracted.
Figure 2B:
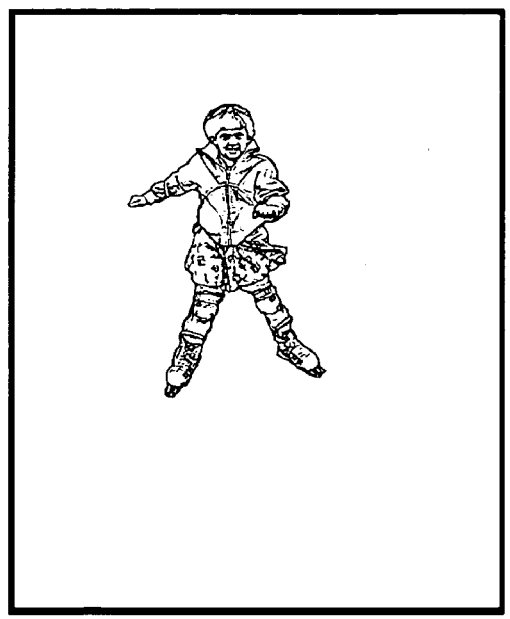
FIG. 2*b* a view similar to FIG. 2*a* illustrating the subject identified by an outline.

Digital image files, which represent images and provided are via remote ordering site 30 can be transferred to server 16 over the Internet 17 via ISPs 18, 34. Algorithms at computer 32 or server 16 may be used to extract a subject 42 from the background of an image. FIG. 2a illustrates an image 41 from which the subject 42 to be extracted. The algorithm may be applied to the full resolution image 41 or a surrogate, lower resolution image. The result of the subject extraction algorithm is displayed on the display device 44 (See FIG. 1) of computer 32 as shown by FIG. 2b. In one method of identifying the subject 42, an outline 43 of the subject 42 is displayed as illustrated by FIG. 2c. The user can indicate the subject 42 by any of the following methods including: manually tracing around the edge of the subject, point to point connection of dots and lines around the subject, key point indication and automated subject extraction. The custom cut pattern indicia (outline) 43 would be visible around the subject 42. When the user verifies the selection of the custom cut pattern indicia 43, the subject 42 is removed from background 45. The user verifies that the subject 42 has been extracted correctly or can reapply the extraction algorithm, select a different extraction method, modify the parameters of the extraction algorithm or manually edit the subject extraction.

Once the extracted subject 42 is obtained, it can be replicated and/or resized depending on the image product(s) desired by the consumer. The subject 42 can be made to fit the size of the media on which it is to be printed, scaled to a selected size or printed as many times as desired on a single or plural number of sheets. The extracted subject 42 is printed using a digital printer 20 producing digital print 22.) Digital printing technology can include but is not limited to; a digital photographic printer such as the Kodak Digital Science LF CRT color printer, a thermal dye-sublimation printer such as the KODAK PROFESSIONAL 8670 PS Thermal printer and inkjet printer such as the KODAK Personal Picture Maker 120 by Lexmark or an integrated printer/cutter such as the ColorCAMM PRO Model PC-60 sold by the Roland DGA Corporation. In addition to the extracted subject 42, the user could have the option to select other pre-extracted subjects or clip art, not shown, to add to the digital print 22. Digital print 22 is sent to digital cutter 24 where it is cut in accordance with the instructions or desires of the customer. An example of a suitable printer is the "CX-12", a 12" wide Desktop vinyl Cutter sold by Roland DGA Corp. Since the location of the printed image is known from the information provided to digital printer, the cutter is able to cut the media at predetermined locations so as to form cuts in a predetermined pattern, for example, along the outline of the printed subject. Optionally, a machine readable indicia can be printed on the media 22 by the printer 20 that can be read by cutter 24. The cutter can then use this indicia as an position means for determining placement of the cuts. The cuts provided may be completely around the printed subject or just partially along the outline so as to allow the image to be easily removed from the media.

It is to be understood that printing of the images may be done on a variety of media types, for example, but not limited to: plain paper; an adhesive backed media comprising a printing layer having a printing side and back side and base layer; a media having a printing base layer and base layer that may comprise of a flexible magnetic layer, a static cling layer or a transparent base; an image receiving heat shrink film layer and a heat shrink base layer. If an adhesive backed media is used the resulting cut digital print 22, is cut in such a way that the image media is cut and the adhesive release layer is not so as to facilitate removal of the cut adhesive backed print. Cut digital print 22 is placed in a package 52 for delivery the customer at site 30 or any designated location. If the originating location is a retail outlet, payment can be made to the retailer when the custom cut image product 22 is picked up by the customer. If the originating location 30 is a private home or a public location like a public library, payment can be made at the time the custom cut product is ordered, via credit card or C.O.D. whichever is appropriate.

While in the illustrated embodiment, separate printing and cutting devices are disclosed, the functions of the digital printer 22 and digital cutter 24 can be integrated with a single unit as with the "ColorCAMM PRO Model PC-60", sold by Roland DGA Corp.

Figure 3A:
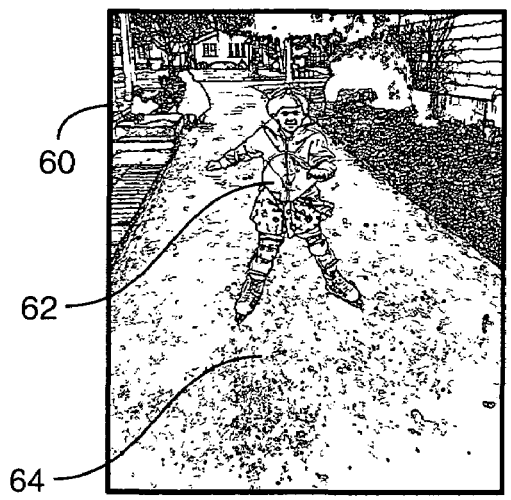
FIG. 3*a* is a view similar to FIG. 2*a*.
Figure 3C:
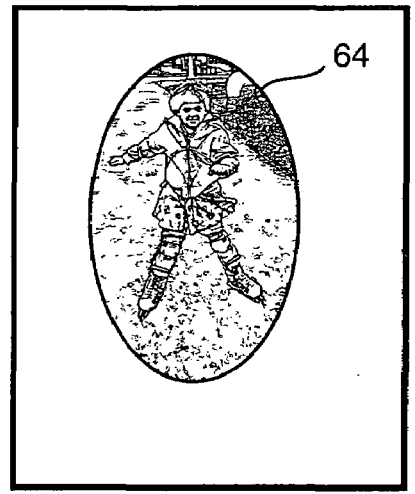
FIG. 3*c* illustrates the identified subject as to how it would be viewed on a display device.
Figure 3B:
FIG. 3*b* is a view similar to FIG. 3*a* illustrating a fixed pattern for identifying a subject.
Figure 3D:
Figure 4A:
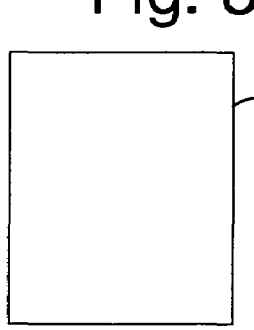
FIGS. 4*a*-4*c* illustrates several examples of fixed patterns.
Figure 4B:
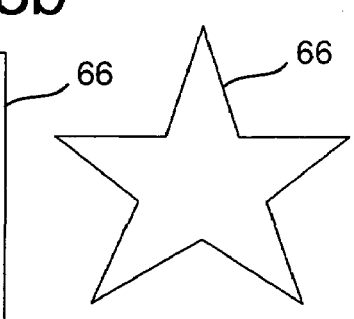
Figure 4C:
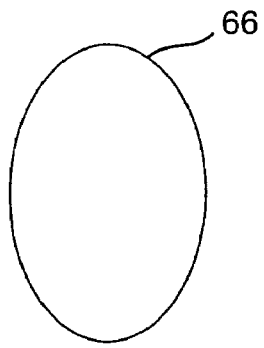

FIG. 3a is an illustration of image 60 from a digital image file having a subject from which a fixed pattern custom cut image product is to be made. The image 60 comprises an image subject 62 and background 64 which would be displayed on the computer display device 44. The user would select fixed cut pattern indicia 66 and place it around image subject 62. Fixed cut pattern indicia 66 can be any shape or size and can be scaled to fit image subjects of any size. FIGS. 4a, 4b and 4c illustrate but a few examples of various shapes the cut pattern indicia 66 may take. When positioned correctly the user verifies the selection and the fixed cut pattern indicia 66 including the image subject is removed from background 64. The resulting custom cut print via fixed cut pattern indicia 66 is produced as illustrated by FIG. 3d.

Figure 5:
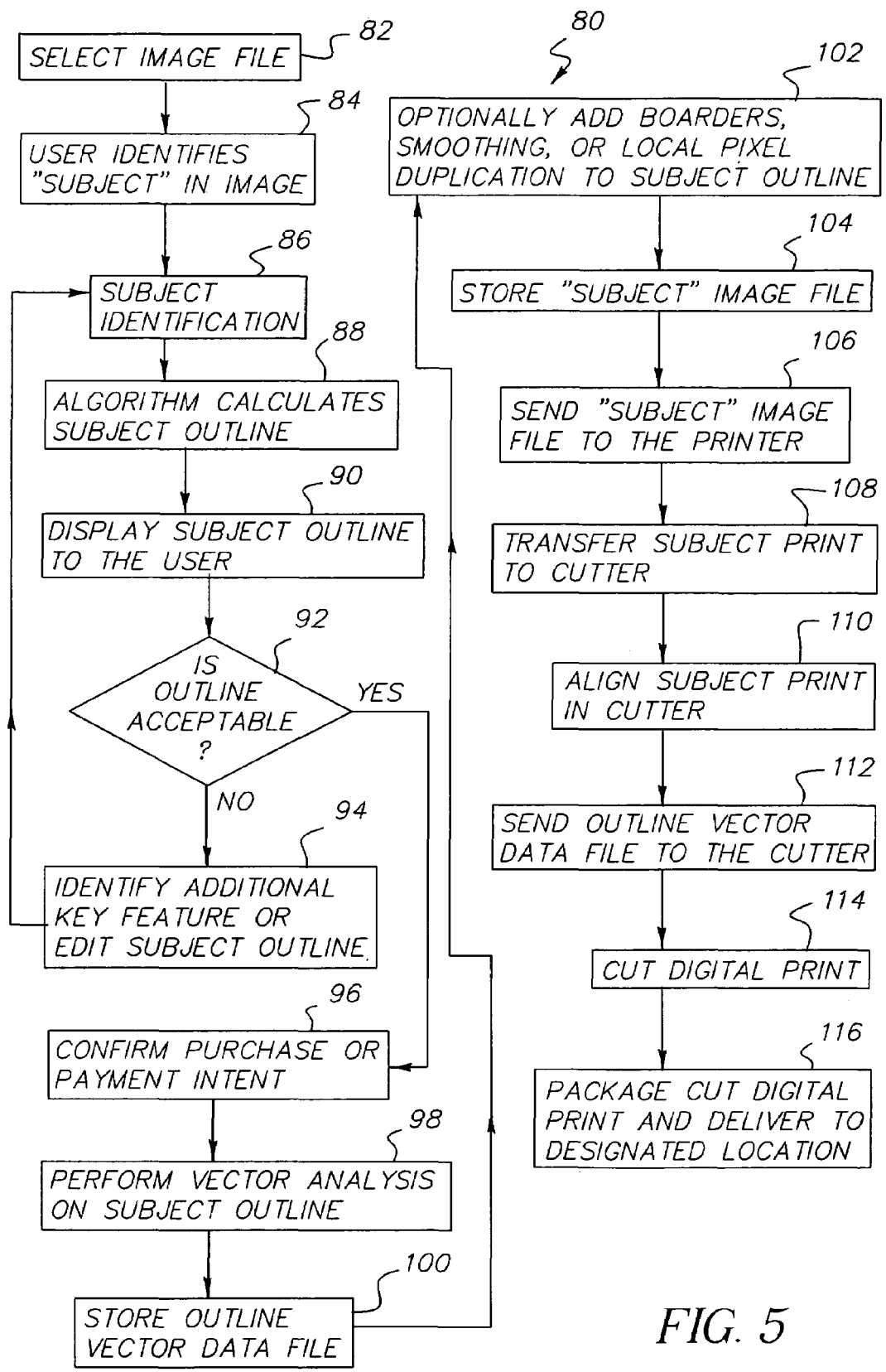
FIG. 5 is an operational flowchart of the system of FIG. 1.

FIG. 5 is an operational flowchart 80 of a method according to the present invention. The method starts with select image step 82 where the user chooses an image file to obtain a subject that is to be used to make a custom cut image product. Selection step 82 requires the user to visually identify the subject on the computer display device 44. The user indicates, via a standard input device such as a mouse or a touch screen, the subject's eyes, a rough outline or the edge of the subject. PhotoShop® 6.0 by Adobe Systems Incorporated provides a software tool such as a "Smart Lasso" to assist the user in defining the subject 62 from the background 64. In the case where an image is generated with a chroma key system, such as the "Holoset" system by Play Incorporated, the subject 62 can be automatically removed from the background without initial intervention from the user. A similar technique can be used with "subject only" physical items such as sporting or entertainment tickets, greeting cards or other printed matter and memorabilia where the entire printed object is the subject. The item can be scanned with a print/document scanner, such as KODAK DIGITAL SCIENCE PhotoDoc Color Scanner, sold by the Eastman Kodak Company, to automatically obtain a subject without a background.

At step 86, the file of the subject is submitted to the subject identification algorithm to augment the manually input information provided by the user. The subject's edges are estimated at step 88. At step 90, the display image with a visible outline is presented to the user on the computer display device 44.

At decision step 92, the user verifies that the outline is acceptable. If required, the user modifies the outline at step 94 and then goes back to step 86 for resubmission. When the outline is acceptable, the user then does any desired manipulation of the subject and orders goods and/or services starting at step 96. At step 96, the customer confirms purchase and/or payment method. At step 98, the server 16 performs any necessary manipulation and/or calculation such as vector analysis of the selected subject. At step 100, the data from step 98 is stored on server 16. At step 102, image enhancements or further image manipulation occurs. Once this is completed by server 16, the image is stored at step 104. As appropriate, the image at step 106 is sent to the printer 20 for printing. At step 108, the media 22 received from printer 20 is placed in cutter 24. The media 22 at step 110 is aligned in the cutter 24. This alignment can be used so as to locate the image on the media 22 for proper placement of the cuts by cutter 24. Alternatively, as previously discussed, an indicia can be read by cutter 24 that can also be used for location of the subject for cutting at the desired locations. At step 112, the appropriate data from server 16 is obtained by cutter 24 and at step 114 is used to conduct the cutting operation at the predetermined locations. Finally, the cut media XX at step 116 is forwarded to the user designated location.

Because many different types of custom cut products can be created from different media and digital printing techniques, the workflow at the production facility 12 is important for minimizing the cost to facility 12. In addition, the user requires that the correct product type, which has been properly cut, be delivered in a timely manner at a reasonable cost. Altering the digital cutter settings for cut depth, cut pressure and cut speed to accommodate different media types for each individual order received, would interfere with the productivity and workflow and would induce errors into the system resulting in waste and potential damage to the equipment. Therefore in order to maximize the productivity of the production facility, batching of similar type orders are done so that similar media type print orders are processed together with the proper digital cutter settings. Another method for minimizing cost and/or improving efficiency of the system involves having a number of digital cutters each set to process an individual media type and cutting parameter. Alphanumeric eye readable and/or machine identification codes can be printed on a non-image area of the digital print. This code could be read by the cutter to assure that the digital print is cut with a cutter set to the proper setting and also can be used to assure that the proper custom cut image product is delivered to the proper location. Various digital media types that may be utilized at facility 12, include but are not limited to the following: Inkjet Shrink Film sold by Royal Brites, a Mafcote Company to make personalized ornaments, pins and toys; Inkjet Window Decals sold by Royal Brites; A Mafcote Company a transparency material with a tacky, semi-adhesive layer and release layer to attach the print to windows; and Inkjet Magnetic Paper sold by Royal Brites, A Mafcote Company for making prints that attach to ferrous metal surfaces; Inkjet Photo Stickers sold by Eastman Kodak Company an inkjet print material with an adhesive layer and release layer; and Thermal dye sublimation sticker prints such as 4700 Photo Printer Media Kit by Eastman Kodak Company.

Figure 6A:
FIG. 6*a* is a plan view of an image that is to be made into a cut image product.
Figure 6B:
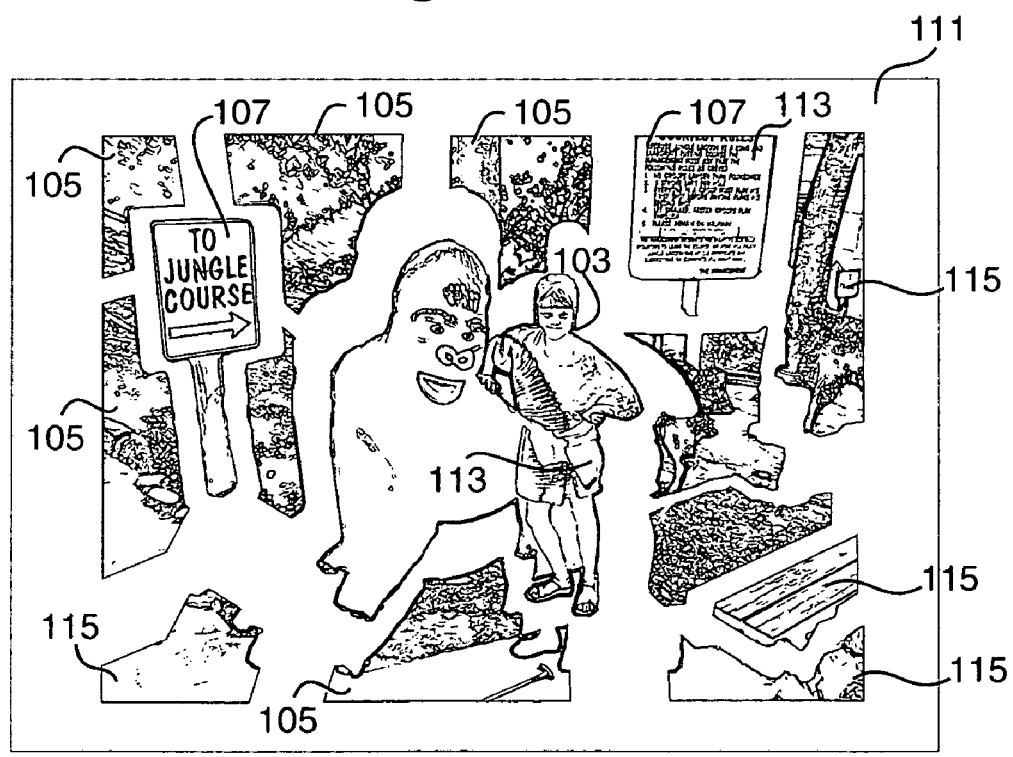
FIG. 6*b* is an exploded view of the image product of FIG. 6*a* made into a puzzle.

In FIG. 6a, there is an illustration of a media 101 that is to be made into the form of a puzzle 111, as shown by FIG. 6a with an image subject 103 and background elements 105. In addition to the primary image subject 103, additional scene elements 107 can be defined in the same way as the primary image subject 103. For a content derived puzzle 111, the primary image subject 103 and additional scene elements 107 can be cut to form custom cut image subject puzzle piece 113 and custom cut scene element puzzle pieces 115. For the remaining background elements 105 that have no discrete large objects, this area can be randomly cut to form random cut puzzles pieces. The media for constructing custom cut content derived puzzles may be integral magnetic media or magnetically backed print media or any suitable heavy stock digital print media.

Figure 7A:
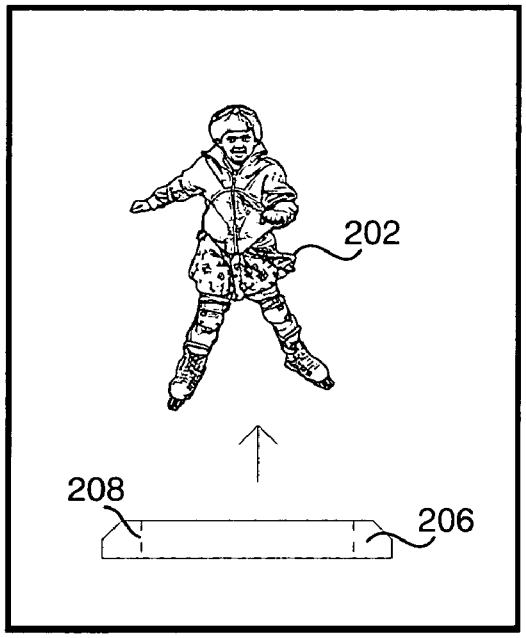
FIG. 7*a* is a plan view of a display of subject and supporting stand that is to be made in a cut image product according to the present invention.
Figure 7B:
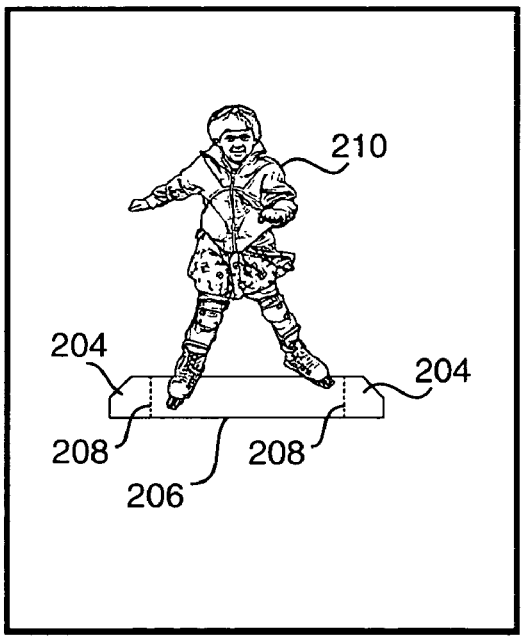
FIG. 7*b* is a view similar to FIG. 7*a* showing the supporting stand as a part of the cut image product.
Figure 7C:
FIG. 7*c* is plan view of a cut image product made from the subject of FIGS. 7*a* and 7*b*.

Referring to FIGS. 7a–7c, there is illustrated a content derived freestanding custom cut image product 200 which in the embodiment illustrated is a custom cut paper doll stand. Image product 200 is created in the form of the extracted subject 202 that has been altered by the addition of digitally generated paper doll stand 206. Paper doll stand 206 may also be integrally formed with the subject 202. The product 200 may be placed into the proper position manually by the user using a pointing device or automatically positioned by an algorithm. In order to form the support sections 204 of the paper doll stand 206, pre-scored or digitally printed fold lines 208, are added. A score line 210 can be created with a digital cutter with a perforation pattern instead of a contiguous cut for removing of the designated subject from media 22. In addition dulled knives can be used in the digital cutter to create a score line to facilitate folding for custom cut image products such as origami models, folded greeting cards or boxes and other formed containers and shapes.

Other custom cut image products include stencils, silhouettes, magnetic or adhesive frames, speech/thought bubbles, greeting cards and origami. In order to entice or inform the user of the availability of the array custom cut images product options that are available, these options can be presented on the user's computer monitor after the subject has been extracted.

It is to be understood various changes and modification may be made without departing from the scope of the present invention, the present invention being defined by the claims set forth herein.

PARTS LIST

10 System
12 Production facility
14 Communication network
16 Computer/Server
17 Internet
18 Internet Service Provider (ISP)
20 Digital printer
22 Media/digital print
24 Digital Cutter
30 Remote ordering site
32 Computer
34 Internet Service Provider (ISP)
36 Digital camera
38 Image scanner
41 Image
42 Subject
43 Outline/Custom cut pattern indicia
44 Display device
45 Background -continued

PARTS LIST

| | |
|---|---|
| 60 | Image |
| 62 | Image subject |
| 64 | Background |
| 66 | Fixed cut pattern indicia |
| 80 | Flowchart |
| 82 | Step |
| 86 | Step |
| 88 | Step |
| 90 | Step |
| 92 | Step |
| 94 | Step |
| 96 | Step |
| 98 | Step |
| 100 | Step |
| 101 | Media |
| 102 | Step |
| 103 | Image subject |
| 104 | Step |
| 105 | Background elements |
| 106 | Step |
| 107 | Scene elements |
| 108 | Step |
| 110 | Step |
| 111 | Puzzle |
| 112 | Step |
| 113 | Custom cut image subject puzzle pieces |
| 114 | Step |
| 115 | Custom cut scene element puzzle pieces |
| 116 | Step |
| 200 | Image product |
| 202 | Extracted subject |
| 204 | Support sections |
| 206 | Paper doll stand |
| 208 | Pre-scored/Digitally printed fold lines |
| 210 | Score line |

What is claimed is:

1. A method for obtaining custom cut images products by an unskilled user comprising:
a user identifying a subject within a digital image at a first location for producing a cut image product;
automatically differentiating a selected subject from a background of said digital image;
creating a selected subject image file of the selected subject;
placing an order over a communication network to a production facility at a second location that is remote from said first location for producing a cut image product using said selected subject image file;
printing an image of said selected subject on a sheet of media from said selected subject image file; and
conducting cutting operations, with respect to said selected subject on said sheet of media, at predetermined locations on said sheet of media based on position location information stored in said selected subject image file.

2. The method according to claim 1 wherein said produced cut image product is delivered to a remote location.

3. The method according to claim 1 wherein a number of said cut image product are produced on said sheet of media.

4. The method according to claim 1 wherein a computer software program is used to automatically differentiate said selected subject from said background.

5. The method according to claim 1 wherein said sheet of media comprises an adhesive release layer and a image receiving layer having a printing side and a back side, said image receiving layer being positioned over said release layer, said back side having an adhesive layer thereon.

6. The method according to claim 5 wherein said cut image product is made only on said printing side.

7. The method according to claim 1 wherein said sheet of media comprises a base layer and an image receiving layer having a printing side and a back side, said image receiving layer being positioned over said base layer.

8. The method according to claim 7 wherein said base layer comprises a flexible magnetic layer.

9. The method according to claim 7 wherein said base layer comprises a static cling base layer.

10. The method according to claim 7 wherein said base layer is a transparent base layer.

11. The method according to claim 1 wherein said cut sheet of media comprises an image receiving heat shrink film layer and a heat shrink base layer.

12. The method according to claim 1 wherein said cut image product comprises a free standing image having a stand section.

13. The method according to claim 12 wherein said stand is integrally part of said cut image product.

14. The method according to claim 1 wherein said first location comprises a customer computer.

15. The method according to claim 1 wherein said first location comprises a kiosk at a retail location.

16. A method for obtaining custom cut image products by an unskilled user comprising:
a user identifying a subject within a digital image at a first location for producing a cut image product using a computer;
automatically differentiating a selected subject from a background of said digital image using a computer software;
creating a selected subject image file of the selected subject;
placing an order over a communication network using said computer, to a production facility at a second location that is remote from said first location for producing a cut image product using said selected subject;
printing an image of said selected subject on a sheet of media; and
conducting cutting operations, with respect to said selected subject on said sheet of media, at predetermined locations on said sheet of media based on position location information stored in said selected subject image file.

17. A method for obtaining custom cut images products by an unskilled user comprising:
a user identifying a subject within a digital image at a first location for producing a cut image product;
automatically differentiating a selected subject from a background of said digital image;
creating a selected subject image file of the selected subject;
placing an order over a communication network to a production facility at a second location that is remote from said first location for producing a cut image product using said selected subject;
printing an image of said selected subject on a sheet of media; and
conducting cutting operations, with respect to said selected subject on said sheet of media, at predetermined locations on said sheet of media based on position location information stored in said selected subject image file wherein a machine readable indicia is provided at the predetermined locations on the media that can be read by a cutting device that is used to produce said cut image product.

18. A method for obtaining custom cut image products by an unskilled user comprising:
a user identifying a subject within a digital image at a first location for producing a cut image product using a computer;
automatically differentiating a selected subject from a background of said digital image using a computer software;
creating a selected subject image file of the selected subject;
placing an order over a communication network using said computer, to a production facility at a second location that is remote from said first location for producing a cut image product using said selected subject;
printing an image of said selected subject on a sheet of media; and
conducting cutting operations, with respect to said selected subject on said sheet of media, at predetermined locations on said sheet of media based on position location information stored in said selected subject image file wherein a machine readable indicia is provided at the predetermined locations on the media that can be read by a cutting device that is used to produce said cut image product.

* * * * *